United States Patent
Kim

(10) Patent No.: US 11,855,945 B2
(45) Date of Patent: Dec. 26, 2023

(54) METHOD, COMPUTER DEVICE, AND NON-TRANSITORY COMPUTER-READABLE RECORDING MEDIUM TO PICK AND DISPLAY MESSAGE IN MESSAGING-BASED SOCIAL NETWORK SERVICE

(71) Applicant: LINE Plus Corporation, Seongnam-si (KR)

(72) Inventor: Julie Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/846,608

(22) Filed: Jun. 22, 2022

(65) Prior Publication Data
US 2022/0417197 A1    Dec. 29, 2022

(30) Foreign Application Priority Data
Jun. 24, 2021    (KR) .................. 10-2021-0082157

(51) Int. Cl.
*H04L 51/224*    (2022.01)
*H04L 51/216*    (2022.01)
*H04L 51/04*    (2022.01)

(52) U.S. Cl.
CPC ............ *H04L 51/224* (2022.05); *H04L 51/04* (2013.01); *H04L 51/216* (2022.05)

(58) Field of Classification Search
CPC ...... H04L 51/224; H04L 51/04; H04L 51/216
See application file for complete search history.

(56) References Cited

U.S. PATENT DOCUMENTS

| 10,678,401 B2 * | 6/2020 | Deets, Jr. ............... H04L 51/043 |
| 2016/0364368 A1 * | 12/2016 | Chen ...................... H04L 51/216 |

FOREIGN PATENT DOCUMENTS

| JP | 2019-215865 A | 12/2019 |
| KR | 10-2002-0074304 A | 9/2002 |
| KR | 10-2014-0142579 A | 12/2014 |
| KR | 10-1839226 B1 | 3/2018 |
| KR | 10-2021-0055391 A | 5/2021 |

OTHER PUBLICATIONS

Korean Office Action of Korean Application No. 10-2021-0082157, dated Jun. 16, 2022.

* cited by examiner

*Primary Examiner* — Cheikh T Ndiaye
(74) *Attorney, Agent, or Firm* — Sughrue Mion, PLLC

(57) ABSTRACT

A method, a computer device, and a non-transitory computer-readable recording medium are provided to select and display a message in a messaging-based social network service. A message selection and display method includes displaying, in a chatroom, main messages selected from among unread messages in the chatroom at a time of entry into the chatroom; and displaying, in the chatroom, at least one additional message among previous unread messages and subsequent unread messages of a specific message based on the specific message selected from among the main messages.

20 Claims, 11 Drawing Sheets

220

METHOD, COMPUTER DEVICE, AND NON-TRANSITORY COMPUTER-READABLE RECORDING MEDIUM TO PICK AND DISPLAY MESSAGE IN MESSAGING-BASED SOCIAL NETWORK SERVICE

CROSS-REFERENCE TO RELATED APPLICATION(S)

This application claims priority from Korean Patent Application No. 10-2021-0082157, filed on Jun. 24, 2021, the disclosure of which is incorporated herein by reference in its entirety.

BACKGROUND

Technical Field

Apparatuses and methods consistent with example embodiments relate to technology for providing a messaging-based social network service.

Related Art

An instant messenger is a general communication tool that allows a user to send and receive a message or data in real time. The user may register a contact on a messenger and may send and receive messages with a counterpart on a contact list in real time.

Due to such a messenger function, the messenger is commonly used in a mobile environment of a mobile communication terminal as well as a personal computer (PC).

For example, a mobile messenger service system and a portable terminal provide a messenger service between mobile messengers installed on mobile terminals via a wireless communication network.

As the use of an instant messenger becomes more popular and functions provided through the instant messenger become more diversified, an openchat function that enables a chat in a non-acquaintance-based environment using a link without sharing personal information, such as a telephone number and an ID, is being serviced.

SUMMARY

Some example embodiments may provide a method and an apparatus for selecting and displaying a useful message for a user in a messaging-based social network service.

Some example embodiments provide a function capable of initially reading a main message selected from among unconfirmed new messages in a chatroom.

Some example embodiments provide a function capable of expanding and reading an unconfirmed new message based on a specific main message.

According to an aspect of the disclosure, there is provided a method of selecting and displaying a message performed by a computer device including at least one processor configured to execute computer-readable instructions included in a memory. The method may include: controlling a chatroom to display main messages selected from among unread messages in the chatroom at a time of entry into the chatroom; and controlling the chatroom to display at least one additional message among previous unread messages and subsequent unread messages of a specific message based on the specific message selected from among the main messages.

The controlling the chatroom to display the main messages comprises controlling the chatroom to initially display the main messages when more than a preset number of unread messages are present at the time of entry into the chatroom.

The controlling the chatroom to display the main messages comprises sorting the main messages in order of a message reception time in the chatroom.

The controlling the chatroom to display the main messages comprises controlling the chatroom to display a message including a preset keyword at a top of the chatroom, among the main messages.

The controlling the chatroom to display the main messages comprises sorting the main messages in order of a number of reactions by other users participating in the chatroom.

The controlling the chatroom to display the at least one additional message comprises displaying, as the additional message, a preset number of unread messages based on the specific message.

The controlling the chatroom to display the at least one additional message comprises controlling the chatroom to display, as the additional message, an unread message received within a preset period of time based on the specific message.

The controlling the chatroom to display the main messages comprises using a different message user interface (UI) for each of the main messages in the chatroom.

The controlling the chatroom to display the at least one additional message comprises controlling the chatroom to display the additional message through a same message UI as that of the specific message.

The controlling the chatroom to display the main messages comprises: selecting messages of different timestamps as the main messages from among the unread messages based on a preset time interval or a preset number of intervening messages.

The controlling the chatroom to display the main messages comprises: selecting, as the main messages, the unread messages in which reactions by other users participating in the chatroom meet a preset condition.

The controlling the chatroom to display the main messages comprises: from among the unread messages, selecting an unread message including a preset keyword as the main message.

The controlling the chatroom to display the main messages comprises: from among the unread messages, selecting an unread message that matches a topic extracted from a conversation pattern in the chatroom as the main message.

The controlling the chatroom to display the main messages comprises: from among the unread messages, selecting unread messages that are exchanged between other users participating in the chatroom as the main messages.

According to another aspect of the disclosure, there is provided a non-transitory computer-readable recording medium storing instructions that, when executed by at least one processor, cause the at least one processor to perform a message selection and display method. The message selection and display method may include: controlling a chatroom to display main messages selected from among unread messages in the chatroom at a time of entry into the chatroom; and controlling the chatroom to display at least one additional message among previous unread messages and subsequent unread messages of a specific message based on the specific message selected from among the main messages.

According to another aspect of the disclosure, there is provided a computer device including: at least one memory storing computer-readable instructions; and at least one processor configured to execute the computer-readable instructions to execute: control a chatroom to display main messages selected from among unread messages in the chatroom at a time of entry into the chatroom, and control the chatroom to display at least one additional message among previous unread messages and subsequent unread messages of a specific message based on the specific message selected from among the main messages.

The at least one processor may be further configured to control the chatroom to display a message including a preset keyword among the main messages at a top of the chatroom or to sort the main messages in order of a number of reactions by other users participating in the chatroom.

The at least one processor may be further configured to control the chatroom to display, as the additional message, a preset number of unread messages or an unread message received within a preset period of time based on the specific message.

The at least one processor may be further configured to: control the chatroom to display a different message user interface (UI) for each of the main messages, and control the chatroom to display the additional message through a same message UI as that of the specific message.

The at least one processor may be further configured to: select messages of different timestamps as the main messages from among the unread messages based on a preset time interval or a preset number of intervening messages.

BRIEF DESCRIPTION OF DRAWINGS

The above and/or other aspects will be more apparent by describing certain example embodiments, with reference to the accompanying drawings, in which.

DETAILED DESCRIPTION

Figure 1:
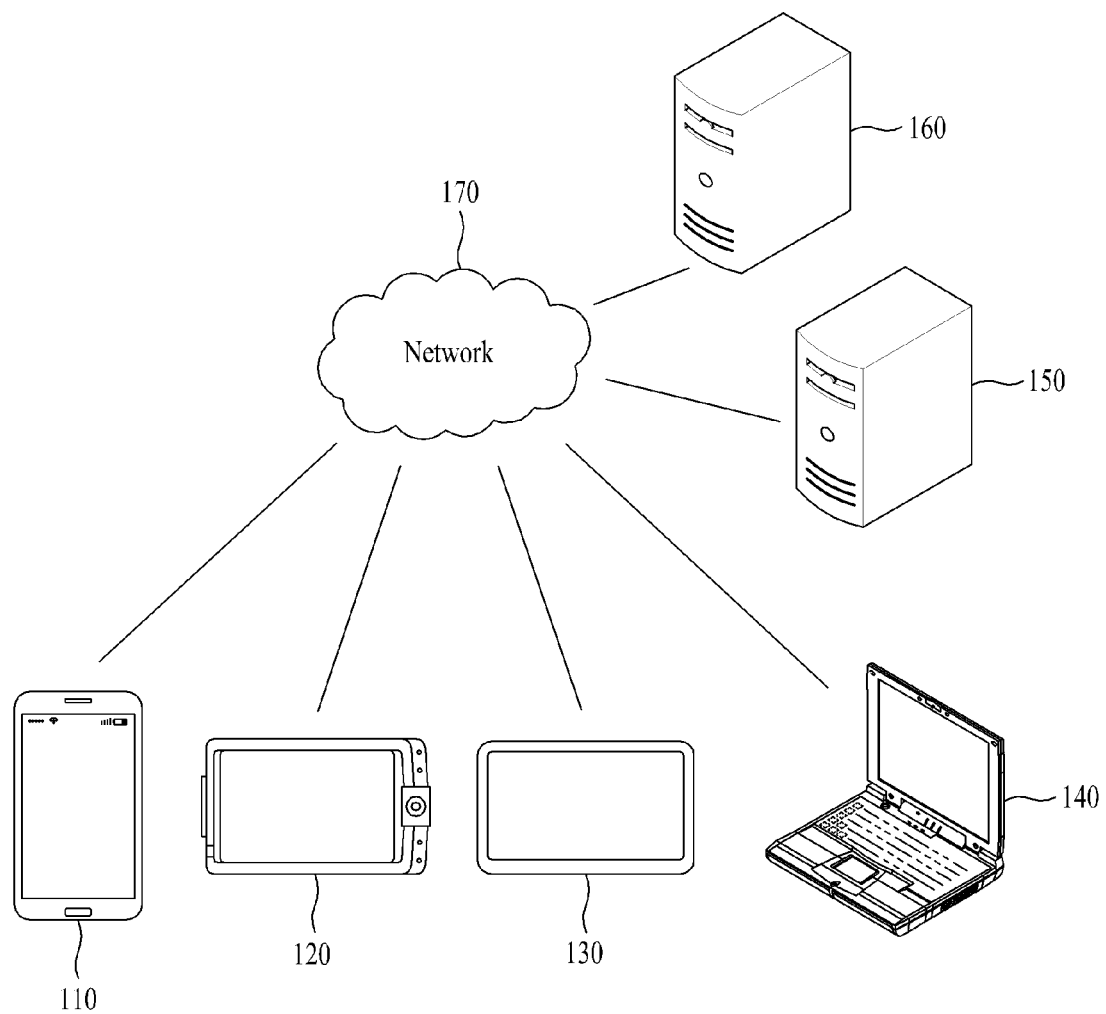
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for providing a messaging-based social network service.

The example embodiments including disclosures herein may select and display a useful message for a user from among messages in a chatroom in a messaging-based social network service.

The chatroom used herein may encompass a community space provided from the messaging-based social network service, such as a messenger and a social network service (SNS). In the example embodiment, the chatroom may include a community space that allows a user to participate in a conversation between non-acquaintances on the premise of joining as well as an acquaintance-based community space. For example, the chatroom may correspond to a chatroom with at least one account added as a friend through a friend addition process using a telephone number and an ID, an open chatroom that allows an immediate chat using a link, such as a uniform resource locator (URL), without a friend addition process, a chatroom with an official account that represents an account in a form of a bot providing various types of services or contents.

A message selection and display system according to some example embodiments may be implemented by at least one computer device. A message selection and display method according to some example embodiments may be performed by at least one computer device included in the message selection and display system. Here, a computer program according to an example embodiment may be installed and run on the computer device and the computer device may perform the message selection and display method according to example embodiments under control of the computer program. The aforementioned computer program may be stored in a computer-readable recording medium to implement the message selection and display method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a messaging-based social network service, to the plurality of electronic devices 110, 120, 130, and 140 connected over the network 170.

Figure 2:
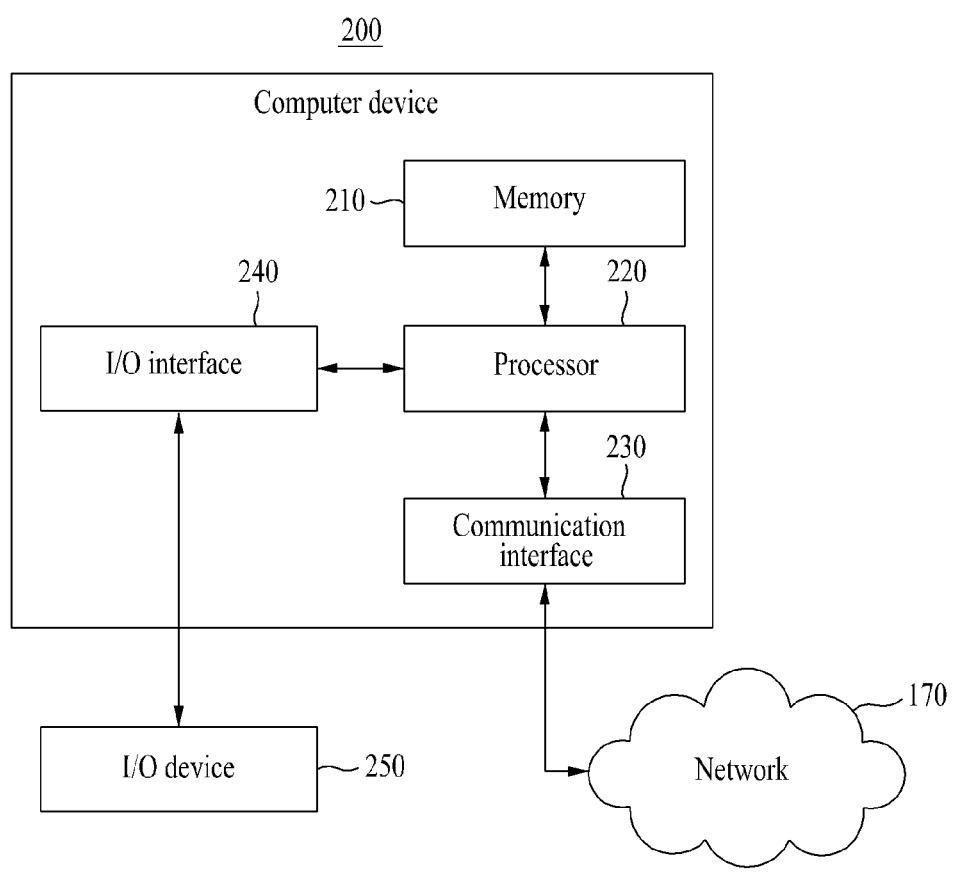
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function or a structure for communication between the communication apparatus 200 and another apparatus, for example, the aforementioned storage devices. For example, the processor 220 of the computer device 200 may deliver a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be delivered to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with a device in which an input function and an output function are integrated into a single function, such as a touchscreen. The I/O device 250 may be configured as a single device with the computer device 200.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O device 250 or may further include other components, such as a transceiver and a database.

Hereinafter, a method and system for selecting and displaying a message in a messaging-based social network service according to example embodiments will be described.

Figure 3:
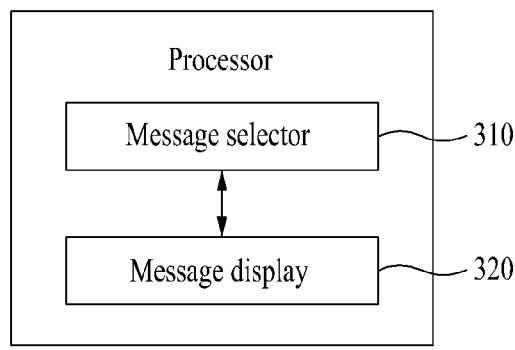
FIG. 3 illustrates an example of a component includable in a processor of a computer device according to at least one example embodiment.
Figure 4:
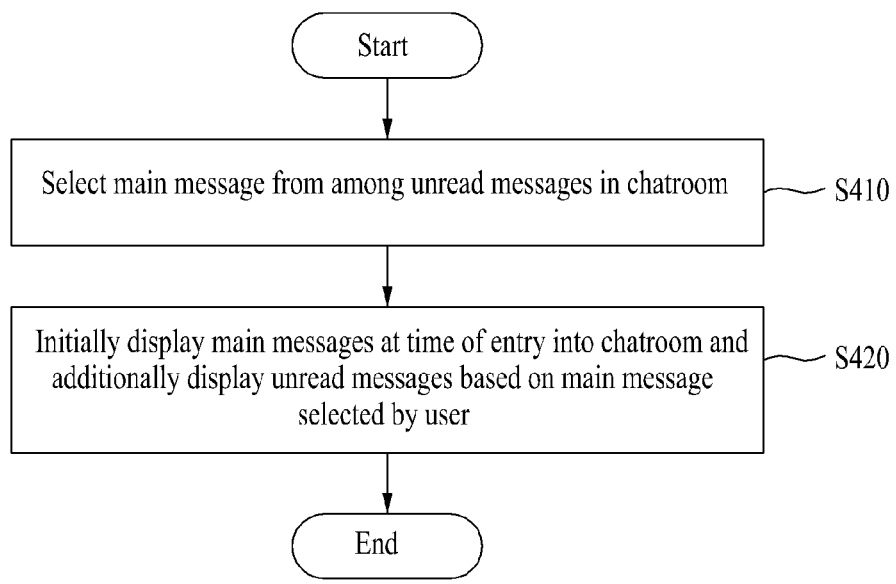
FIG. 4 is a flowchart illustrating an example of a method performed by a computer device according to at least one example embodiment.

FIG. 3 is a diagram illustrating an example of a component included in a processor of a computer device according to at least one example embodiment, and FIG. 4 is a flowchart illustrating an example of a message selection and display method performed by a computer device according to at least one example embodiment.

The computer device 200 according to the example embodiment may provide a message-based social network service through connection to an exclusive application or a website/mobile site. A message selection and display system implemented as a computer may be configured in the computer device 200. For example, the message selection and display system may be implemented in a form of a program that independently operates or may be configured in an in-app form of a specific application to be operable on the specific application.

Referring to FIG. 3, the processor 220 of the computer device 200 may include a message selector 310 and a message display 320 as components that read instructions from the memory 210 to perform the following message selection and display method according to the instructions. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following message selection and display method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200. For example, the message selector 310 may be used as a functional representation of the processor 220 that controls the computer device 200 to select a portion of messages in a chatroom in response to the instruction.

The processor 220 may read an instruction from the memory 210 to control of the computer device 200 according to the instruction. The read instruction may include an instruction for controlling the processor 220 to perform the following message selection and display method.

Operations included in the following message selection and display method may be performed in order different from illustrated order. A portion of the operations may be omitted or an additional process may be further included.

Operations included in the message selection and display method may be performed by a client on which an exclusive application is installed. Depending on example embodiments, a portion of operations may be performed by the server 150.

The messaging-based social network service sorts and displays messages in order of a message transmission time in a chatroom. In the case of a chatroom in which anonymity is guaranteed or a large number of members participate, such as an openchat, a large number of new messages may be accumulated for a short period of time and, among them, a very limited number of messages may be actually useful to a user.

The example embodiments provide a function capable of selectively reading a useful message instead of the entire message stream delivered through the chatroom of the messaging-based social network service.

Referring to FIG. 4, in operation S410, the message selector 310 may select a main message with high informational property from among unconfirmed new messages (hereinafter, unread messages) unread by a user as an incoming message in a chatroom. For example, the message selector 310 may select a message of which informational property is accredited based on reactions from other users participating in the chatroom. For example, the message selector 310 may select a message in which a positive reaction, such as like, mention, reply, comment, share, capture, and keep, from another user meets a predetermined (or, alternatively, desired) condition from among the unread messages as a main message. As another example, the message selector 310 may select a message including a keyword preset by a user as a message that is highly likely to be useful for the user in terms of informational property. At least one keyword the user is interested in may be preset through settings for the chatroom and the message selector 310 may select, as a main message, a message including a specific keyword set by the user from among unread messages. The message selector 310 may select the main message using a keyword that matches a category of the chatroom in addition to the keyword set by the user. As another example, the message selector 310 may analyze a conversation pattern in the chatroom, may extract a topic having a high topicality, and may select a message that matches the topic as a main message. The message selector 310 may extract at least one word talked about in the chatroom at an interval of a unit time and then determine a word that exceeds a certain level as a topic having a high topicality using a topic probability distribution for each message included in the chatroom. The message selector 310 may select, from among unread messages, a message including a keyword identical or similar to each topic as the main message. As another example, the message selector 310 may analyze a conversation pattern in the chatroom and may select, from among unread messages, messages that are exchanged as question and answer (Q&A) between other users as main messages.

The message selector 310 may select messages of different timestamps from among unread messages as main messages. Here, the message selector 310 may guarantee a predetermined (or, alternatively, desired) time interval between the main messages. For example, when selecting a subsequent main message, the message selector 310 may select the subsequent main message from among unread messages that elapse 5 minutes of a timestamp of a previous main message. The message selector 310 may guarantee a time interval of 5 minutes or more between a main message with a timestamp t(n) and a main message with a timestamp t(n+1). Here, n denotes an integer n>=0. Depending on example embodiments, the message selector 310 may guarantee a desired number of messages or more as a message interval between main messages. For example, the message selector 310 may select a subsequent main message from among unread messages that have skipped 100 messages after a previous main message. The message selector 310 may guarantee a preset number of intervening messages (e.g., 100 or more intervening messages) between two consecutive main messages (e.g., the main message with the timestamp t(n) and the main message with the timestamp t(n+1)).

The aforementioned main message selection process, that is, operation S410 may be performed on a client side. Here, the server 150 may select a main message according to a message selection method and may deliver information on the selected main message to a client.

In operation S420, the message display 320 may initially display main messages among unread messages at a time of entry into the chatroom in response to a chatroom entry request from the user. That is, instead of displaying all the unread messages when entering the chatroom, the message display 320 may initially display only a highly informational message determined to be interesting to the user. Here, the message display 320 may sort and display main messages in order of a time in which a corresponding message is received. As another example, the message display 320 may assign a priority to a message including a keyword set to the chatroom among main messages and may display the corresponding message at a top. As another example, the message display 320 may sort and display main messages in descending order of a number of specific reactions (e.g., share, reply, etc.) from other users. In addition, various sorting criteria may be used to display the main messages.

Subsequently, the message display 320 provides a function of expanding and reading unread messages based on a specific main message in response to a user request. When the user selects a single main message from among the main messages, the message display 320 may additionally display an unread message corresponding to at least one of a message received before the main message and a message received after the main message based on the selected main message. For example, the message display 320 may display an unread message after the main message selected by the user, that is, an unread message between the main message selected by the user and the subsequent main message. Here, the message display 320 may display a desired number of unread messages based on the main message. Depending on example embodiments, the message display 320 may display an unread message received within a desired period of time after the main message.

Figure 5:
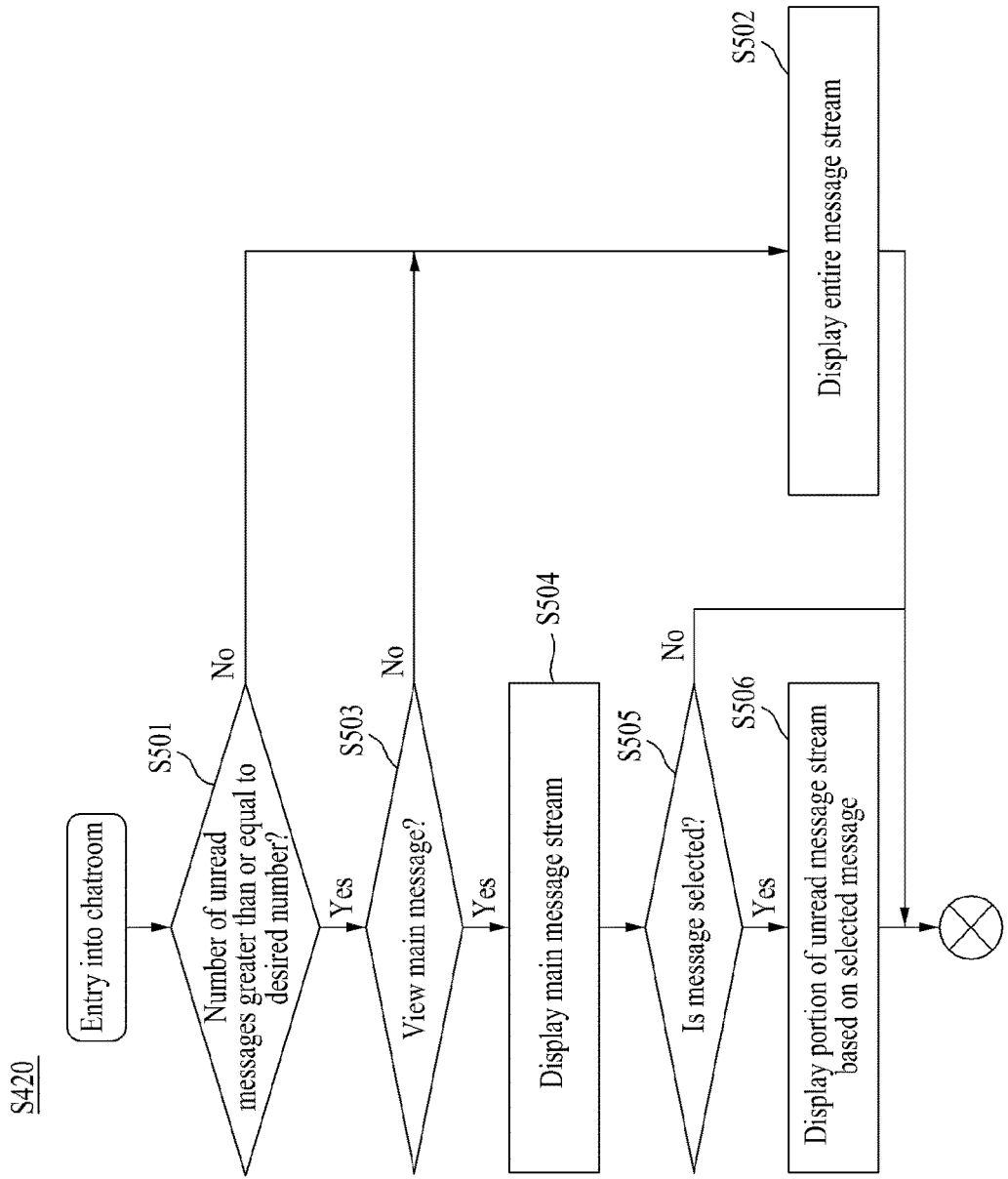
FIG. 5 is a flowchart illustrating an example of a process of displaying an unread message according to at least one example embodiment.

FIG. 5 is a flowchart illustrating an example of a process of displaying an unread message according to at least one example embodiment.

Referring to FIG. 5, in operation S501, in response to a chatroom entry request from the user, the message display 320 may determine whether a number of unread messages corresponding to the chatroom the user requests to enter is greater than or equal to a desired number.

In operation S502, when the number of unread messages corresponding to the chatroom the user requests to enter is less than the desired number, the message display 320 may display the entire message stream corresponding to the unread messages. When the number of unread messages is less than the desired number, the message display 320 may sort unread messages in order of a message reception time at a time of entry into the chatroom and may display the unread messages in a normal view mode in which all unread messages are displayed.

In operation S503, when the number of unread messages corresponding to the chatroom the user requests to enter is greater than or equal to the desired number, the message display 320 may request the user to select a selective message view mode.

A process of selecting the selective message view mode may be omitted in the chatroom entry process.

When the user does not select the selective message view mode, the message display 320 may display unread messages in the normal display mode.

In operation S504, when the user selects the selective message view mode, the message display 320 may initially display only a main message stream selected from among the unread messages.

In operations S505 and S506, when the user selects a specific message from among the main messages, the message display 320 may display at least a portion of an unread message stream received after the specific message based on the specific message.

The message display 320 may select and display a useful message for the user from among unread messages accumulated in the chatroom and then additionally display unread messages before and after a corresponding message according to a user selection.

FIGS. 6 to 11 illustrate examples of a process of displaying an unread message according to at least one example embodiment.

FIGS. 6 to 11 illustrate examples of a messenger interface screen executed on a client device that is an electronic device of a user.

Figure 6:
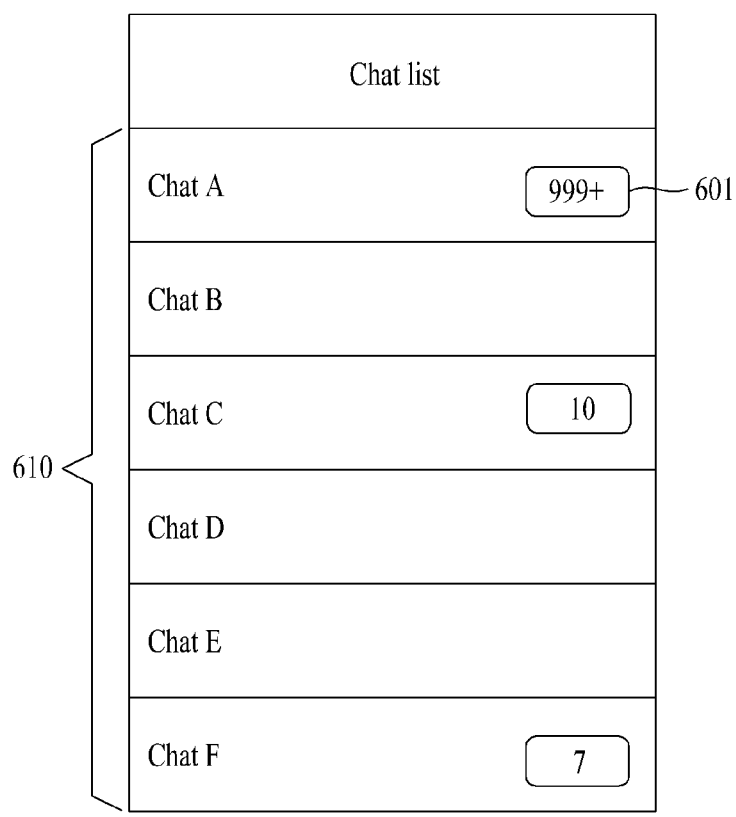
FIGS. 6 to 11 illustrate examples of a process of displaying an unread message according to at least one example embodiment.
Figure 7:
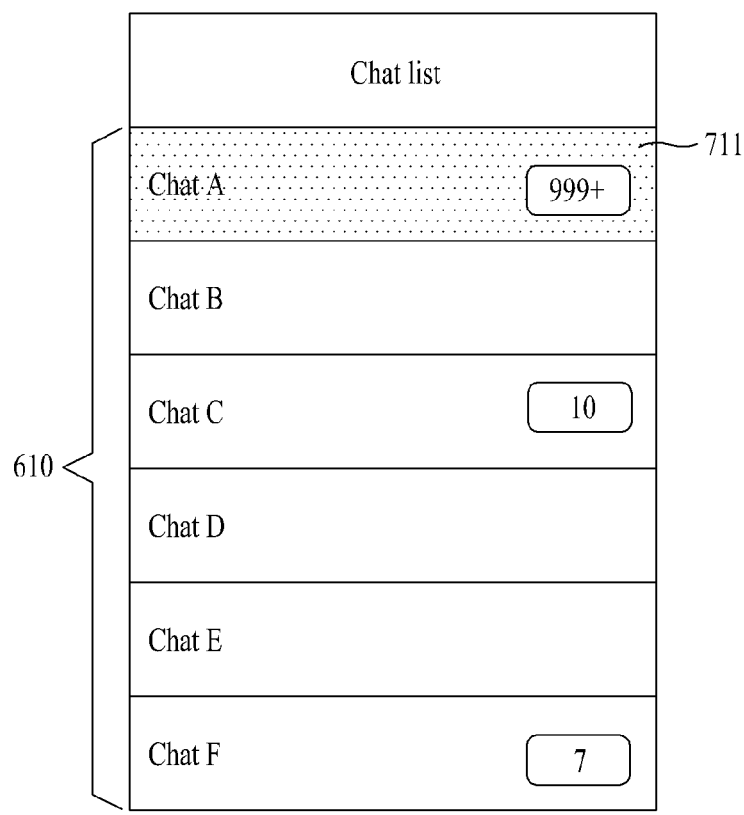

FIGS. 6 and 7 illustrate a chatroom list screen 600 and FIGS. 8 to 11 illustrate a chatroom screen 800 in a selective message view mode.

Referring to FIG. 6, the chatroom list screen 600 may be configured with a chatroom list 610 of all chatrooms created in a messenger.

In the chatroom list 610, chatrooms may be sorted and displayed in order of a recent message reception or transmission time.

Notification information 601 on an incoming message, that is, a received message may be displayed for each chatroom on the chatroom list screen 600. Here, the notification information 601 may include a number of unread messages to provide a notification for a message unconfirmed by the user.

The processor 220 may provide a selective message view mode for a chatroom including more than a desired number of unread messages among chatrooms each in which unread messages are present.

Referring to FIG. 7, depending on example embodiments, to identify a chatroom that may be displayed in the selective message view mode, an item 711 indicating a chatroom including more than a desired number of unread messages in the chatroom list 610 may be displayed to be distinguished from items of other chatrooms.

When entering a chatroom in which a number of unread messages is less than a desired number in the chatroom list 610, the processor 220 may display the unread messages in a normal display mode. When entering a chatroom in which the number of unread messages is greater than or equal to the desired number, the processor 220 may display the unread messages in the selective message view mode.

Even for the chatroom in which the number of unread messages is greater than or equal to the desired number, the processor 220 may display unread messages in the normal display mode according to a user selection. In the chatroom entry process, the normal display mode may be selected as a mode for displaying unread messages. Alternatively, a switch to the normal display mode may be selected in the middle of displaying unread messages in the selective message view mode.

Figure 8:
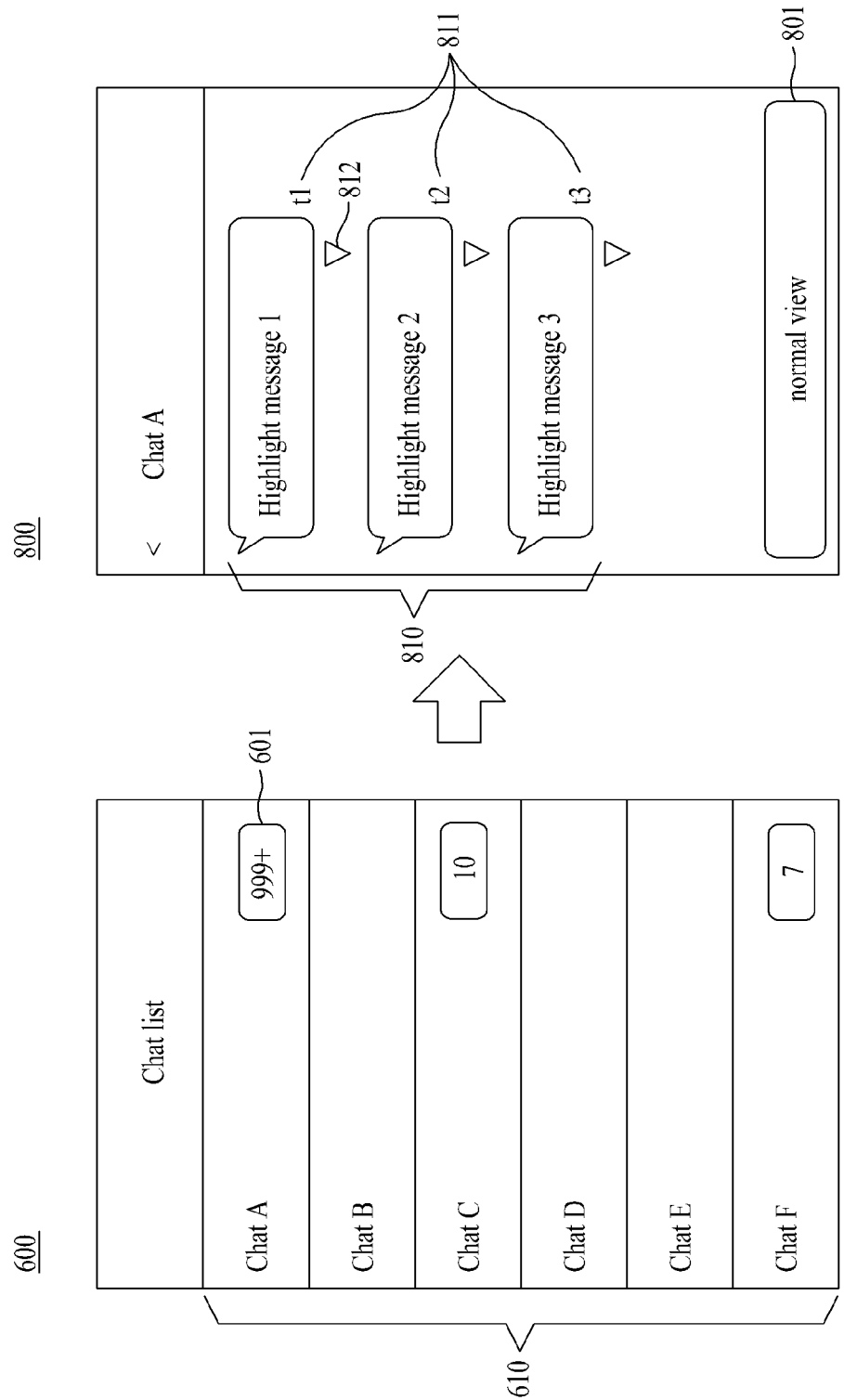

Referring to FIG. 8, when the user selects, from the chatroom list 610, a chatroom in which a number of unread messages is greater than or equal to a desired number, the processor 220 may display the chatroom screen 800 in the selective message view mode.

In the selective message view mode, main messages 810 selected from among unread messages may be sorted based on a predetermined (or, alternatively, desired) condition and displayed on the chatroom screen 800. The main messages 810 may be sorted in descending order of a message reception time 811. Here, a message including a keyword set to the chatroom may be displayed at a top. As another example, the processor 220 may sort and display the main messages 810 in descending order of a number of reactions from other users participating in the chatroom, for example, a number of shares, or a number of "like" reactions.

Figure 9:
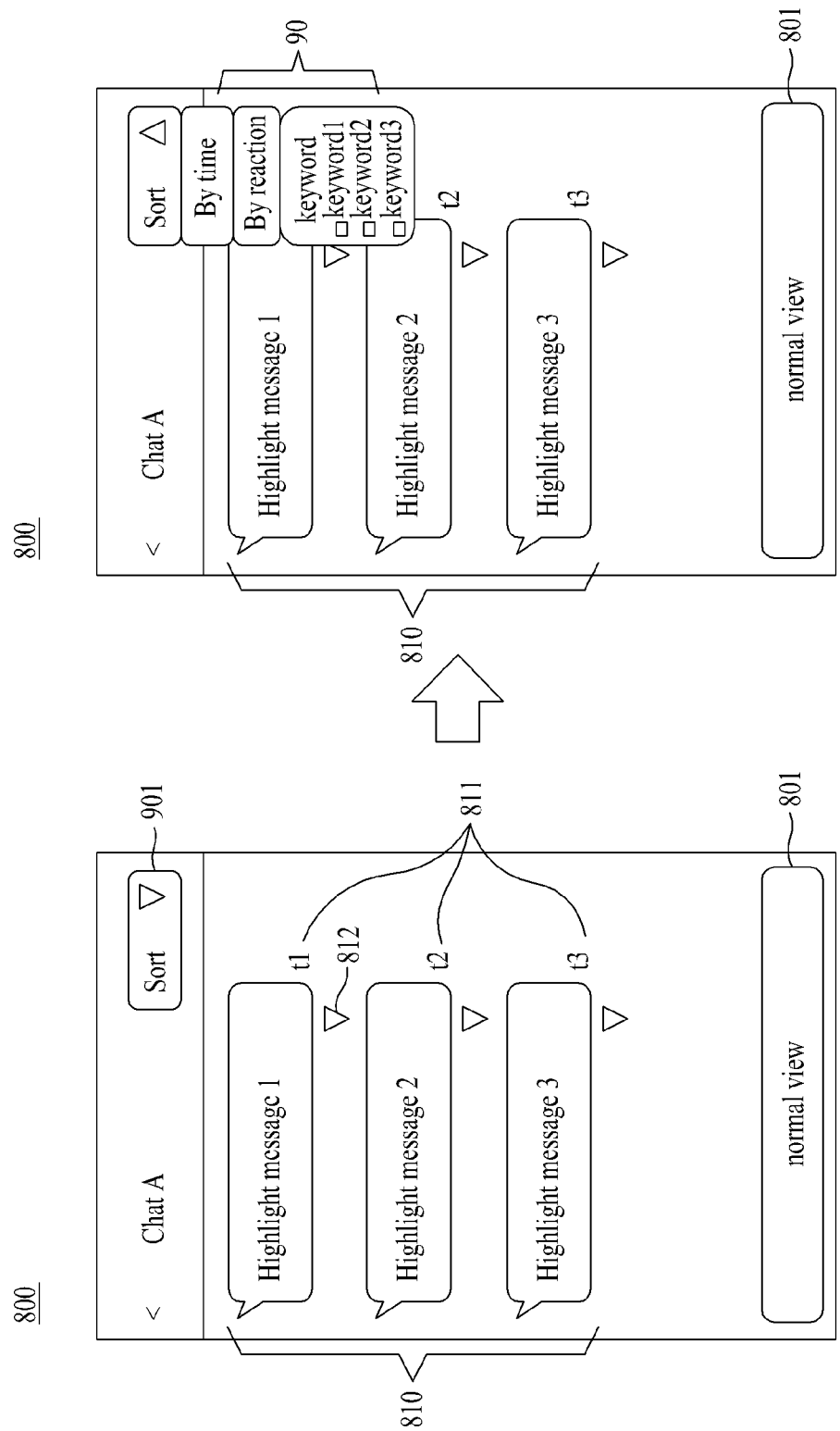

Referring to FIG. 9, depending on example embodiments, a "message sort (sort)" menu 901 that allows a user to directly select a criterion for sorting the main messages 810 may be displayed on the chatroom screen 800. The "message sort" menu 901 may include a sorting criterion 90 for sorting the main messages 810 on the chatroom screen 800. The processor 220 may sort and display the main messages 810 using the sorting criterion 90 selected through the "message sort" menu 901.

The processor 220 may display the message reception time 811 for each of the main messages 810 and may provide a drop-down menu 812 for displaying an additional unread message based on the corresponding main message 810.

The chatroom screen 800 in the selective message view mode may include a mode switching menu 801 for switching to the normal display mode for displaying all of the unread messages.

In the selective message view mode, the mode switching menu 801 may be displayed on the chatroom screen 800. During execution of the selective message view mode, the chatroom screen 800 may be switched to the normal display mode using the mode switching menu 801.

Figure 10:
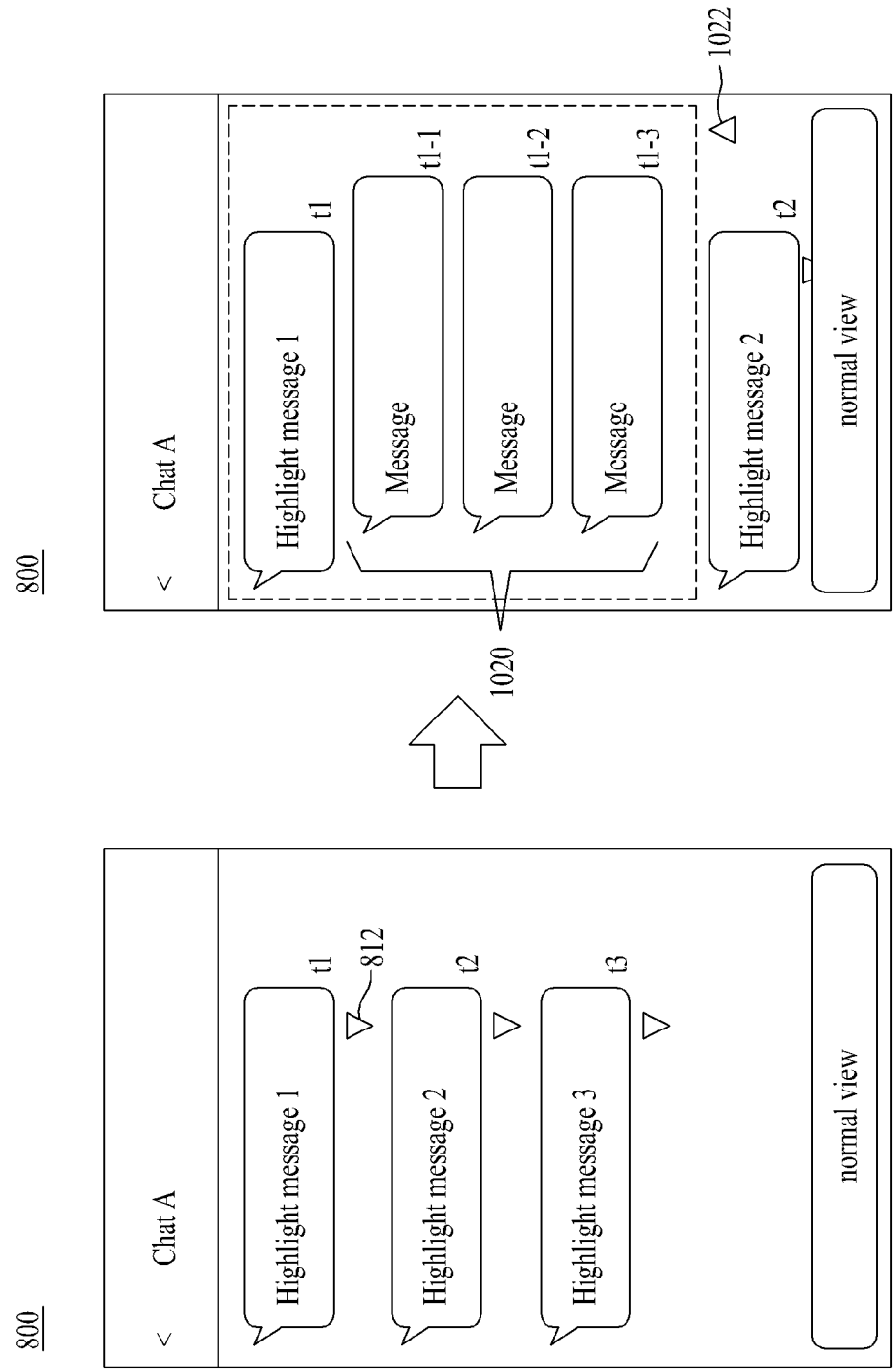

Referring to FIG. 10, in response to a selection on the drop-down menu 812 of the specific main message 810 on the chatroom screen 800, the processor 220 may display additional unread messages 1020 based on the corresponding main message 810.

The additional unread messages 1020 expanded and displayed through the drop-down menu 812 may correspond to, for example, messages received after the main message 810. In response to a selection on the drop-down menu 812 of a timestamp t1 message (hereinafter, t1 message) among the main messages 810, the processor 220 may additionally display an unread message received between the t1 message and a t2 message. Here, the processor 220 may display a desired number (e.g., 10) of messages received after the t1 message or may display a message received within a predetermined (or, alternatively, desired) period of time (e.g., 5 minutes) after the t1 message among unread messages received between the t1 message and the t2 message. Depending on example embodiments, the processor 220 may display a message of a common conversation topic among the unread messages between the t1 message and the t2 message, that is, may additionally display a message that is received after the t1 message and of which conversation topic is not changed.

In a state in which the additional unread messages 1020 are displayed based on the main message 810, the drop-down menu 812 may be switched to a collapsed menu 1022 for processing the additional unread messages 1020 to be hidden.

Figure 11:
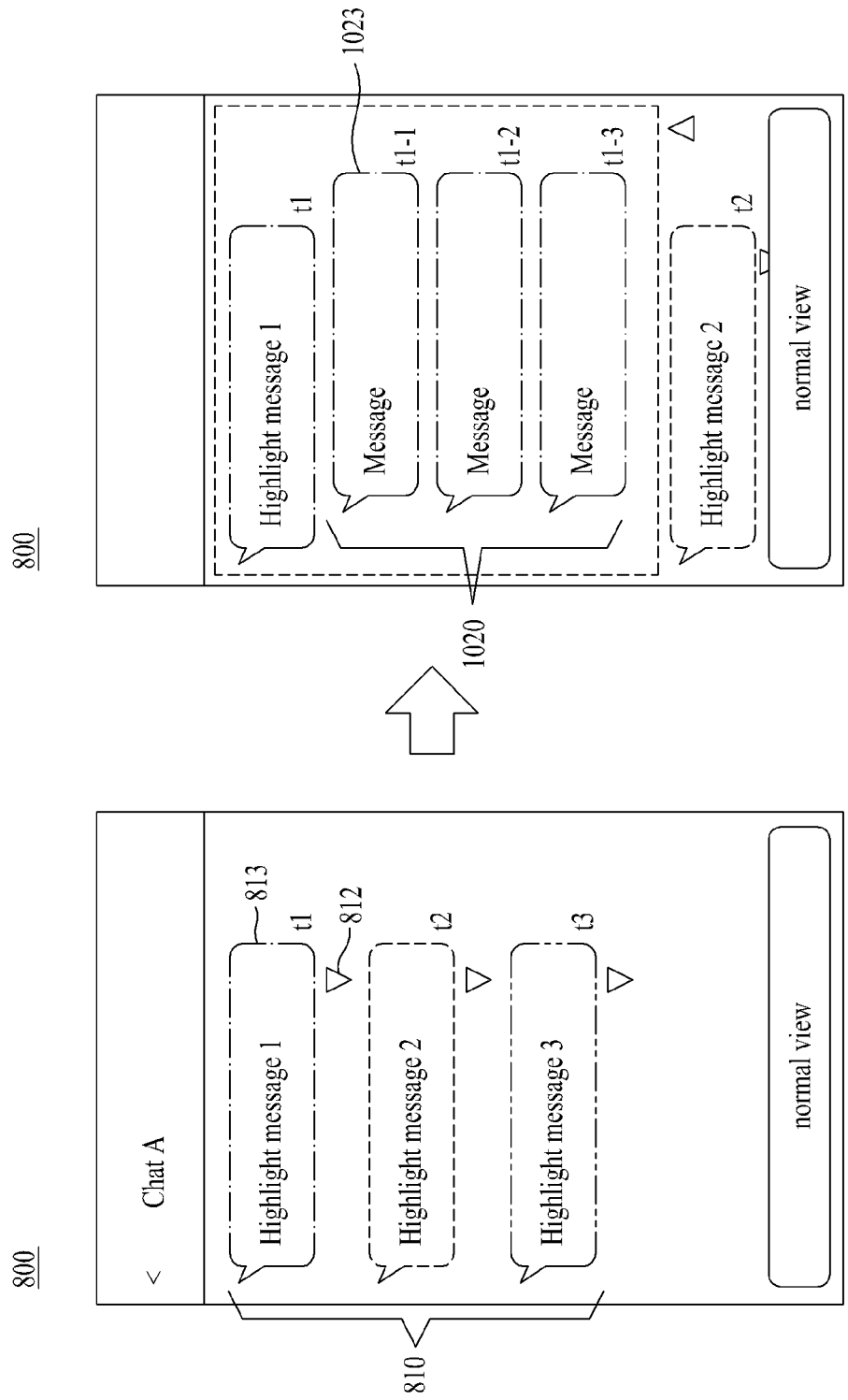

Referring to FIG. 11, the processor 220 may differently display a display element (e.g., a color or a shape of a speech bubble, a text color, etc.) of a message user interface (UI) 813 for each of the main messages 810.

When displaying the additional unread messages 1020 based on the main message 810, the processor 220 may display the unread messages 1020 through the same message UI 1020 as the message UI 813 of the main message 810. That is, the processor 220 may display the main message 810 and the additional unread messages 1020 provided based on the main message 810 through the message UI 813, 1023 in a unified style. Displaying messages through a message UI in a unified style may include displaying at least one of a shape or a color of a message speech bubble, and a text color, a font, and a shadow of a message in the same manner.

It is possible to initially display the main message with high informational property among unread messages in the selective message view mode and then to selectively expand and display an additional unread message based on the main message 810.

According to some example embodiments, it is possible to implement a new method of a message display mode by selecting and displaying a useful message for a user among unread messages in a chatroom. As a selective message view mode, it is possible to provide a function capable of initially reading a message with high informational property among unread messages and a function capable of selectively expanding and reading unread messages based on a specific main message.

The apparatuses described above may be implemented using hardware components, software components, and/or a combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A method of selecting and displaying a message performed by a computer device comprising at least one processor configured to execute computer-readable instructions included in a memory, the method comprising:
   determining, in response to a chatroom entry request for a chatroom being received, whether a number of unread messages in the chatroom is greater than or equal to a predetermined number;
   controlling the chatroom as a selective message view mode to display main messages selected from among the unread messages in the chatroom at a time of entry into the chatroom in response that the number of unread messages is greater than or equal to the predetermined number; and
   controlling the chatroom to display at least one additional message among previous unread messages and subsequent unread messages of a specific message based on the specific message selected from among the main messages.

2. The method of claim 1, wherein the method further comprises
   controlling the chatroom as a normal view mode to display entire message stream corresponding to the unread messages in response that the number of unread messages is less than the predetermined number.

3. The method of claim 1, wherein the controlling the chatroom to display the main messages comprises sorting the main messages in order of a message reception time in the chatroom.

4. The method of claim 1, wherein the controlling the chatroom to display the main messages comprises controlling the chatroom to display a message including a preset keyword at a top of the chatroom, among the main messages.

5. The method of claim 1, wherein the controlling the chatroom to display the main messages comprises sorting the main messages in order of a number of reactions by other users participating in the chatroom.

6. The method of claim 1, wherein the controlling the chatroom to display the at least one additional message comprises displaying, as the additional message, a preset number of unread messages based on the specific message.

7. The method of claim 1, wherein the controlling the chatroom to display the at least one additional message comprises controlling the chatroom to display, as the additional message, an unread message received within a preset period of time based on the specific message.

8. The method of claim 1, wherein the controlling the chatroom to display the main messages comprises using a different message user interface (UI) for each of the main messages in the chatroom.

9. The method of claim 8, wherein the controlling the chatroom to display the at least one additional message comprises controlling the chatroom to display the additional message through a same message UI as that of the specific message.

10. The method of claim 1, wherein the controlling the chatroom to display the main messages comprises:
    selecting messages of different timestamps as the main messages from among the unread messages based on a preset time interval or a preset number of intervening messages.

11. The method of claim 1, wherein the controlling the chatroom to display the main messages comprises:
    selecting, as the main messages, one or more unread messages among the unread messages in which reactions by other users participating in the chatroom meet a preset condition.

12. The method of claim 1, wherein the controlling the chatroom to display the main messages comprises:
    from among the unread messages, selecting an unread message including a preset keyword as at least one of the main messages.

13. The method of claim 1, wherein the controlling the chatroom to display the main messages comprises:
    from among the unread messages, selecting an unread message that matches a topic extracted from a conversation pattern in the chatroom as at least one of the main messages.

14. The method of claim 1, wherein the controlling the chatroom to display the main messages comprises:
    from among the unread messages, selecting unread messages that are exchanged between other users participating in the chatroom as the main messages.

15. A non-transitory computer-readable recording medium storing instructions that, when executed by at least one processor, cause the at least one processor to perform a message selection and display method comprising:
    determining, in response to a chatroom entry request for a chatroom being received, whether a number of unread messages in the chatroom is greater than or equal to a predetermined number;

controlling the chatroom as a selective message view mode to display main messages selected from among the unread messages in the chatroom at a time of entry into the chatroom in response that the number of unread messages is greater than or equal to the predetermined number; and controlling the chatroom to display at least one additional message among previous unread messages and subsequent unread messages of a specific message based on the specific message selected from among the main messages.

16. A computer device comprising:

at least one memory storing computer-readable instructions; and at least one processor configured to execute the computer-readable instructions to execute:

determine, in response to a chatroom entry request for a chatroom being received, whether a number of unread messages in the chatroom is greater than or equal to a predetermined number;

control the chatroom as a selective message view mode to display main messages selected from among the unread messages in the chatroom at a time of entry into the chatroom in response that the number of unread messages is greater than or equal to the predetermined number, and control the chatroom to display at least one additional message among previous unread messages and subsequent unread messages of a specific message based on the specific message selected from among the main messages.

17. The computer device of claim 16, wherein the at least one processor is further configured to control the chatroom to display a message including a preset keyword among the main messages at a top of the chatroom or to sort the main messages in order of a number of reactions by other users participating in the chatroom.

18. The computer device of claim 16, wherein the at least one processor is further configured to control the chatroom to display, as the additional message, a preset number of unread messages or an unread message received within a preset period of time based on the specific message.

19. The computer device of claim 16, wherein the at least one processor is further configured to:

control the chatroom to display a different message user interface (UI) for each of the main messages, and control the chatroom to display the additional message through a same message UI as that of the specific message.

20. The computer device of claim 16, wherein the at least one processor is further configured to:

select messages of different timestamps as the main messages from among the unread messages based on a preset time interval or a preset number of intervening messages.

* * * * *